(12) United States Patent
Stappelmann et al.

(10) Patent No.: US 9,757,822 B2
(45) Date of Patent: Sep. 12, 2017

(54) METHOD FOR ASSEMBLING A CAMSHAFT

(71) Applicant: THYSSENKRUPP PRESTA TECCENTER AG, Eschen (LI)

(72) Inventors: Andreas Stappelmann, Chemnitz (DE); Peter Wiesner, Mauren (LI); Falk Muhsfeldt, Bucha (DE)

(73) Assignee: THYSSENKRUPP PRESTA TECCENTER AG, Eschen (DE)

( * ) Notice: Subject to any disclaimer, the term of this patent is extended or adjusted under 35 U.S.C. 154(b) by 158 days.

(21) Appl. No.: 14/654,631

(22) PCT Filed: Dec. 18, 2013

(86) PCT No.: PCT/EP2013/003843
§ 371 (c)(1),
(2) Date: Jun. 22, 2015

(87) PCT Pub. No.: WO2014/101991
PCT Pub. Date: Jul. 3, 2014

(65) Prior Publication Data
US 2015/0343576 A1    Dec. 3, 2015

(30) Foreign Application Priority Data
Dec. 21, 2012 (DE) .................. 10 2012 025 442

(51) Int. Cl.
*B23P 11/02* (2006.01)
*F01L 1/047* (2006.01)
*B23P 11/00* (2006.01)

(52) U.S. Cl.
CPC ............. *B23P 11/00* (2013.01); *B23P 11/025* (2013.01); *F01L 1/047* (2013.01);
(Continued)

(58) Field of Classification Search
CPC ..... B23P 11/00; B23P 11/025; B23P 2700/02; F01L 1/047; F01L 2001/0473;
(Continued)

(56) References Cited

U.S. PATENT DOCUMENTS

2006/0005385 A1* 1/2006 Quaas ................... B23P 11/025
29/888.08
2013/0283613 A1* 10/2013 Walter ................ B21D 53/845
29/888.06

FOREIGN PATENT DOCUMENTS

| WO | 2011160240 | 12/2011 |
| WO | 2012031770 | 3/2012 |
| WO | 2013156564 | 10/2013 |

OTHER PUBLICATIONS

PCT International Search Report mailed Sep. 11, 2014 for PCT International Application No. PCT/EP2013/003843 with English Translation, 6 pages.
(Continued)

*Primary Examiner* — John C Hong
(74) *Attorney, Agent, or Firm* — RMCK Law Group, PLC

(57) ABSTRACT

A method for assembling a camshaft from a support shaft and components to be connected to the support shaft, the components having through-openings for receiving the support shaft. In this method, a support shaft is provided, having first diametrical enlargements in first regions, in which the components are to be secured, and second diametrical enlargements in second regions, in which the components are to be pre-positioned. A diameter (D2) in the second regions is smaller than a diameter (D1) in the first regions The support shaft is cooled and/or the components are heated up, so that the support shaft can be pushed with its
(Continued)

first and second diametrical enlargements through the through-openings of the components.

18 Claims, 8 Drawing Sheets

(52) U.S. Cl.
 CPC ... *B23P 2700/02* (2013.01); *F01L 2001/0471* (2013.01); *F01L 2001/0473* (2013.01); *F01L 2103/00* (2013.01); *Y10T 29/49295* (2015.01)

(58) Field of Classification Search
 CPC .......... F01L 2001/0471; F01L 2103/00; Y10T 29/49295
 See application file for complete search history.

(56) References Cited

OTHER PUBLICATIONS

Seim, Klaus, Herbert Gropp, and Peter Tenberge. "Erhöhung der Sicherheit gebauter Nockenwellen durch Einsatz beschichteter Pressverbindungen." MTZ—Motortechnische Zeitschrift 57.5 (1996): 284-291.

\* cited by examiner

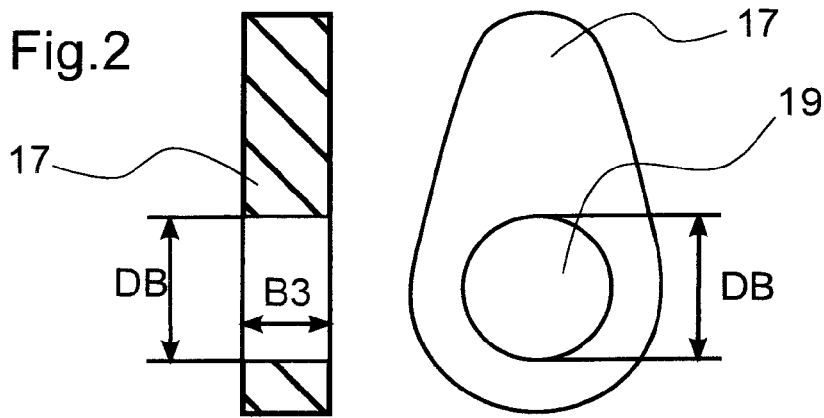
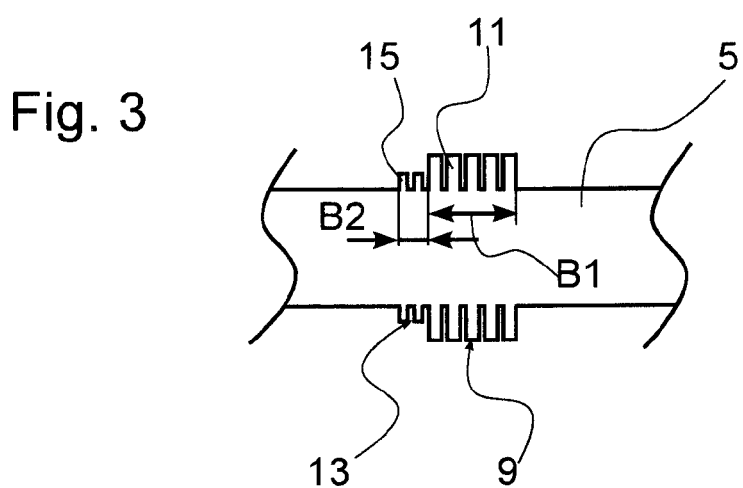
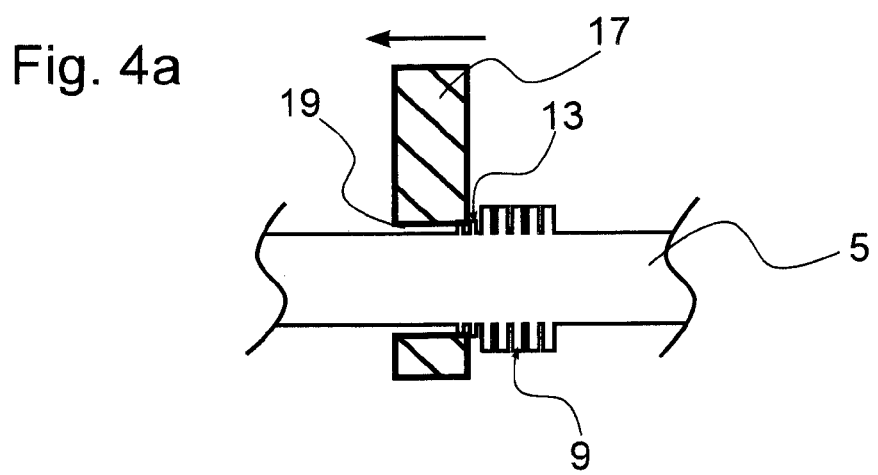

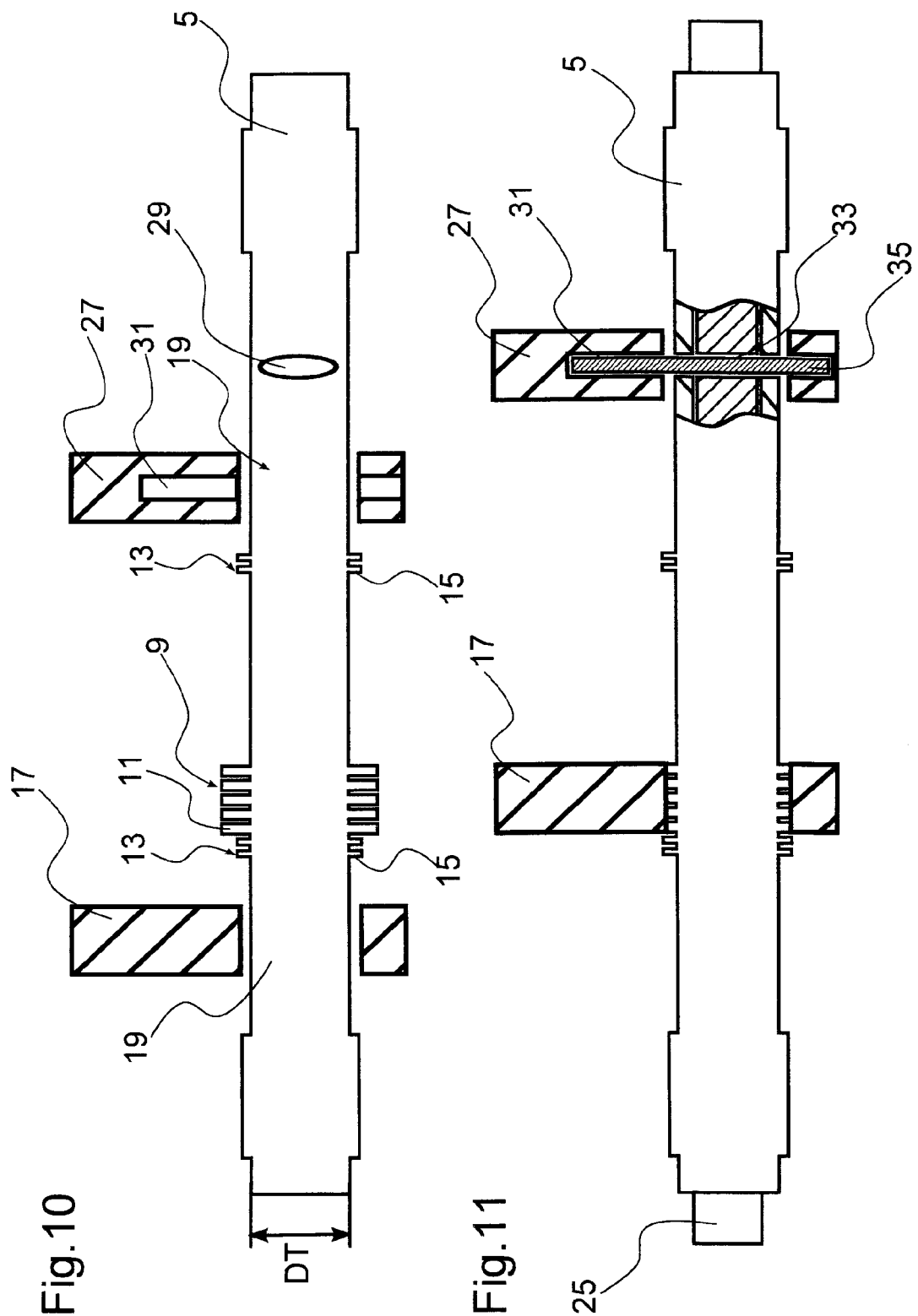

METHOD FOR ASSEMBLING A CAMSHAFT

CROSS-REFERENCE TO RELATED APPLICATIONS

This application is a 371 U.S. National Stage of International Application No. PCT/EP2013/003843, filed Dec. 18, 2013, which claims priority to German Application No. DE102012025442.3 filed on Dec. 21, 2012. The disclosure of each of the above applications is incorporated herein by reference in their entirety.

FIELD

The present disclosure relates to a method for assembling a camshaft and an engine module for a motor vehicle engine.

BACKGROUND

In order to reduce the assembly effort involved in assembling a motor vehicle engine and reduce the stockkeeping and logistical costs incurred in engine assembly, ready-assembled engine modules are supplied to the automobile manufacturers by the suppliers directly to the assembly line. Such engine modules consist for example of a cylinder head cover and a camshaft mounted therein. In the course of assembling the engine, all that is then necessary is to secure this module to the cylinder head of the engine.

An assembly method for an engine module consisting of a cylinder head cover and a camshaft mounted therein is described in WO2012/031770 A1. In the case of this known assembly method, a cylinder head cover with lead-throughs, through which the cylindrical support shaft of the later camshaft is inserted, is provided. Previously, the components to be secured, such as for example cams, sensor wheels, etc., are positioned at axial positions that do not correspond to the axial positions that these components assume on the completed camshaft. In the next step, the support shaft is pushed through the lead-throughs in the cylinder head cover and through through-openings in the components. Prior to the pushing through of the support shaft, the components to be secured on the support shaft are first heated up and the support shaft is cooled down, in order to ensure force-free pushing in of the support shaft. After the pushing in of the support shaft, the components are first releasably fixed on respectively assigned diametrical enlargements. In later steps, the components are released from the assigned diametrical enlargements and set in their angular position. After that, they are secured on the same assigned diametrical enlargements by pressing on or pressing in.

This method has the disadvantage that the diametrical enlargements were deformed by the releasable fixing. This first deformation reduces the strength of the connection between the components and the support shaft that is obtained in the final deformation by pressing in or pressing on. In the case of components with a serration in the through-opening there is the further disadvantage that the serration leaves scores behind in the diametrical enlargement during the releasable fixing. These scores reduce the accuracy in the later setting of the angular position. It has surprisingly been found that, during the pressing on or pressing in of the components, the serration tends to return to the original scores. The scores therefore lead to an additional torque, which changes the angular position of the components during the pressing in or pressing on and thus brings about deviations from the required angular position.

SUMMARY

The present disclosure relates to a method for assembling a camshaft and an engine module for a motor vehicle engine. The camshaft is rotatably mounted in a cylinder head cover. The invention similarly relates to a camshaft that is specially formed for these methods.

The object of the present invention is to overcome these disadvantages in that there is no first deformation of the diametrical enlargements on which the components are secured.

This object is achieved by a method for assembling a camshaft from a support shaft and components to be connected to the support shaft. In this case, the components have through-openings for receiving the support shaft. The method comprises inter alia the following steps:

a support shaft is provided, having first diametrical enlargements in first regions, in which the components are to be secured, and second diametrical enlargements in second regions, in which the components are to be pre-positioned, the diameter in the second regions being smaller than the diameter in the first regions;

the support shaft is cooled and/or the components are heated up, so that the support shaft can be pushed with its first and second diametrical enlargements through the through-openings of the components;

the support shaft is pushed through the through-openings, so that each component is assigned to a second region;

the support shaft is heated up and/or the components are cooled down, so that the diameter of the through-openings of the components is less than the diameter of the assigned second diametrical enlargements;

a predetermined overlap of the components with the second regions assigned to the components is established, so that the components are held in a releasably fixed manner in the assigned second regions;

the components are pressed onto the first diametrical enlargements assigned to them or the first diametrical enlargements are pressed into the assigned through-openings of the components, the required angular position of each component in relation to the support shaft being respectively set before, during or after the pressing on or pressing in.

The object according to the invention is also achieved by a method for assembling a module for a motor vehicle engine that comprises at least one cylinder head cover with bearing receptacles and a camshaft mounted in the bearing receptacles. In this case, the camshaft is constructed in the course of the assembly of the module from a support shaft and components to be connected to the support shaft. Here, the components have through-openings for receiving the support shaft. The method comprises inter alia the following method steps:

a support shaft is provided, having first diametrical enlargements in first regions, in which the components are to be secured, and second diametrical enlargements in second regions, in which the components are to be pre-positioned, the diameter in the second regions being smaller than the diameter in the first regions, and having bearing portions in the regions in which the completed camshaft is to be mounted in the bearing receptacles;

the components to be secured on the support shaft are positioned in a predetermined sequence in such a way that their through-openings are arranged in line with the bearing receptacles of the cylinder head cover;

the support shaft is cooled and/or the components are heated up, so that the support shaft can be pushed with its first and second diametrical enlargements and bearing portions through the through-openings of the components;

the support shaft is pushed through the bearing receptacles and the through-openings, so that a bearing portion of the support shaft is arranged in each bearing receptacle and each component is assigned to a second region;

the support shaft is heated up and/or the components are cooled down, so that the diameter of the through-openings of the components is less than the diameter of the assigned second diametrical enlargements;

a predetermined overlap of the components with the second regions assigned to the components is established, so that the components are held in a releasably fixed manner in the assigned second regions;

the components are pressed onto the first diametrical enlargements assigned to them or the first diametrical enlargements are pressed into the assigned through-openings of the components, the required angular position of each component in relation to the support shaft being respectively set before, during or after the pressing on or pressing in.

While the support shaft is being pushed through the through-openings, it may be advantageous if additional steps are undertaken to maintain the difference in temperature between the support shaft and the components. This may for example take the form of an insulation of the components, in order that they do not cool down too quickly, or corresponding insulation of the support shaft. Alternatively, the components may also be introduced into a heating device, which re-heats the components or keeps them at the predetermined temperature during the assembly method.

In the case of a special development of the invention, before the described temperature equalization, in which the support shaft is heated up and/or the components are cooled down, the components are positioned in such a way that the releasable fixing in the second regions takes place at the same time as the temperature equalization. The components are therefore shrink-fitted onto the second regions. This has the advantage that an additional method step can be saved and the method proceeds particularly efficiently.

In the case of one embodiment of the method, the setting of the respectively required angular position of each component in relation to the support shaft is performed before the pressing on or pressing in by simple turning of the support shaft by a certain angle. In this way, the method can be automated particularly well.

Before the setting of the angular position of the components in relation to the support shaft, the component may either first be released from the assigned second regions or the angular position may be set while the component is releasably fixed in the assigned second region. In both cases, the component is subsequently secured by pressing on or pressing in. The first case has the advantage that no great expenditure of force is required for the relative turning of the component and the support shaft, since the component is freely rotatable during the method step. With the second case, on the other hand, an additional method step in which the component and the axis have to be moved in relation to one another in the axial direction is saved. This reduces the automation requirements.

In the case of a third alternative, the angular position of the components in relation to the support shaft is set while the components are secured in the first regions. This once again allows a method step to be saved. In particular, it has been found that a rotational movement in the region of the required angular position can increase the strength of the connection. This is the case in particular whenever the support shaft provided has a coating in the first regions and/or the component has a coating within the through-opening. The turning causes a diffusion of the coating into the regions of the component and the support shaft that are near the surface, which further increases the strength of the connection. In this way, the camshaft produced can transfer a greater torque between the support shaft and the component. Possible coatings for support shafts and components of steel contain for example zinc, phosphate or copper.

This diffusion may be further intensified if in the last step the components are turned at high frequency about the required angular position before they are left in the required angular position. This additional turning may of course also be performed after the required angular position has been set by means of the first or second alternative. The high-frequency turning has the effect that energy is introduced into the coating, so that intensified diffusion occurs. It has been found that the required amplitude of the rotation (that is to say the angle by which the turning is performed) decreases with increasing frequency. The amplitude of the turning may be up to 360°. Good results have been found with amplitudes in the range of 30° to 60°. Typical frequencies lie in the range between 10 Hz and 30 Hz. Frequencies of up to 100 Hz, preferably up to 150 Hz or higher, are likewise possible.

In some cases, the components may have a serration in the through-opening. As a result, the torque that can be transferred is likewise increased.

In the case of a developed embodiment of the method, the support shaft is formed as a hollow shaft, in the interior of which an inner shaft is arranged concentrically in relation to the hollow shaft. In this case, the inner shaft can be turned in relation to the hollow shaft. At least one component which, after the temperature equalization, is not connected to the support shaft but is connected to the inner shaft for rotation therewith is additionally provided. In particular, this component is connected to the inner shaft by means of a pin connection. For this purpose, an opening is provided in the support shaft formed as a hollow shaft. Furthermore, the inner shaft has a first bore and the component has a second bore. For the securement, the opening, the first bore and the second bore are positioned in line with one another and a connecting pin is pressed through the opening into the first bore and into the second bore.

The object according to the invention is likewise achieved by a camshaft that is particularly formed for carrying out the described method. Such a camshaft comprises a support shaft and a number of components with through-openings for receiving the support shaft. Here, the support shaft has first regions, in which the components are secured. In these first regions there is a first diametrical enlargement. Moreover, the support shaft has second regions with a rotationally symmetrical second diametrical enlargement. In this case, the diameter in the second regions is smaller than the diameter in the first regions. Since the diameter in the second regions is smaller than the diameter in the first regions, a component may first be releasably fixed in a second region and later released from the second region without great force being exerted. Moreover, only a small deformation of the component occurs within the through-opening, and also only in the region of the original overlap with the second region. The form of the component is accordingly only impaired slightly. Any deformation of the component or the support shaft in the later securing regions should be avoided in earlier method steps, since this can have adverse effects on the strength of the connection between the component and the support shaft. The separation into first regions, in which the components are finally secured, and second regions, which serve for the releasable pre-positioning, achieves the effect that the first regions are not changed during the pre-positioning. The fact that the diameter in the second regions is smaller than the diameter in the first regions additionally achieves the effect that even the deformation of the component during the pre-positioning is reduced.

In the case of a developed form of the camshaft, the second regions lie at least partially within the through-openings of the components. It is advantageous here that the required overall axial space can be reduced, and the method can be used even in the case of components that are lying axially close together. It goes without saying that it is then required here that the torques occurring during operation can be transferred by the first region available.

In a further embodiment, the second regions directly adjoin the first regions. Alternatively, an axial distance may also be provided between the first regions and the second regions. While the first variant makes a particularly compact type of construction possible, the second variant has the advantage that, for the final securement in the assigned first region, the component does not have to be moved over the corresponding second region. In the case of this variant, the component may first be releasably fixed with one side on the second region and later secured with the opposite side on the assigned first region, by pressing on or pressing in. This has the advantage that a deformation of the through-opening during the moving over the second region can be avoided. Such a pre-deformation would influence the later strength of the connection of the component. In the case of this variant, only the final deformation occurs, during the securement on the assigned first region by pressing on or pressing in.

DETAILED DESCRIPTION OF THE FIGURES

The invention is explained in more detail below on the basis of schematic drawings, which present the principle of the invention and in which specifically FIG. 1 shows a motor vehicle module in the form of a cylinder head cover with an installed camshaft comprising components and a support shaft;

FIG. 2 shows a component in the form of a cam that is to be secured during the assembly of the camshaft;

FIG. 3 shows an enlargement of a detail of the support shaft with first and second diametrical enlargements;

FIGS. 4a-4d show various method steps between the pre-positioning and the securement of a component in the case of a first embodiment of the invention;

FIG. 10 shows a schematic representation of a hollow support shaft for an adjustable camshaft with two different components 5, only one of which is connected to the support shaft for rotation therewith;

FIG. 11 shows an assembled adjustable camshaft with a hollow support shaft and an inner shaft, arranged concentrically therein and able to turn in relation to the support shaft;

DETAILED DESCRIPTION

Figure 1:
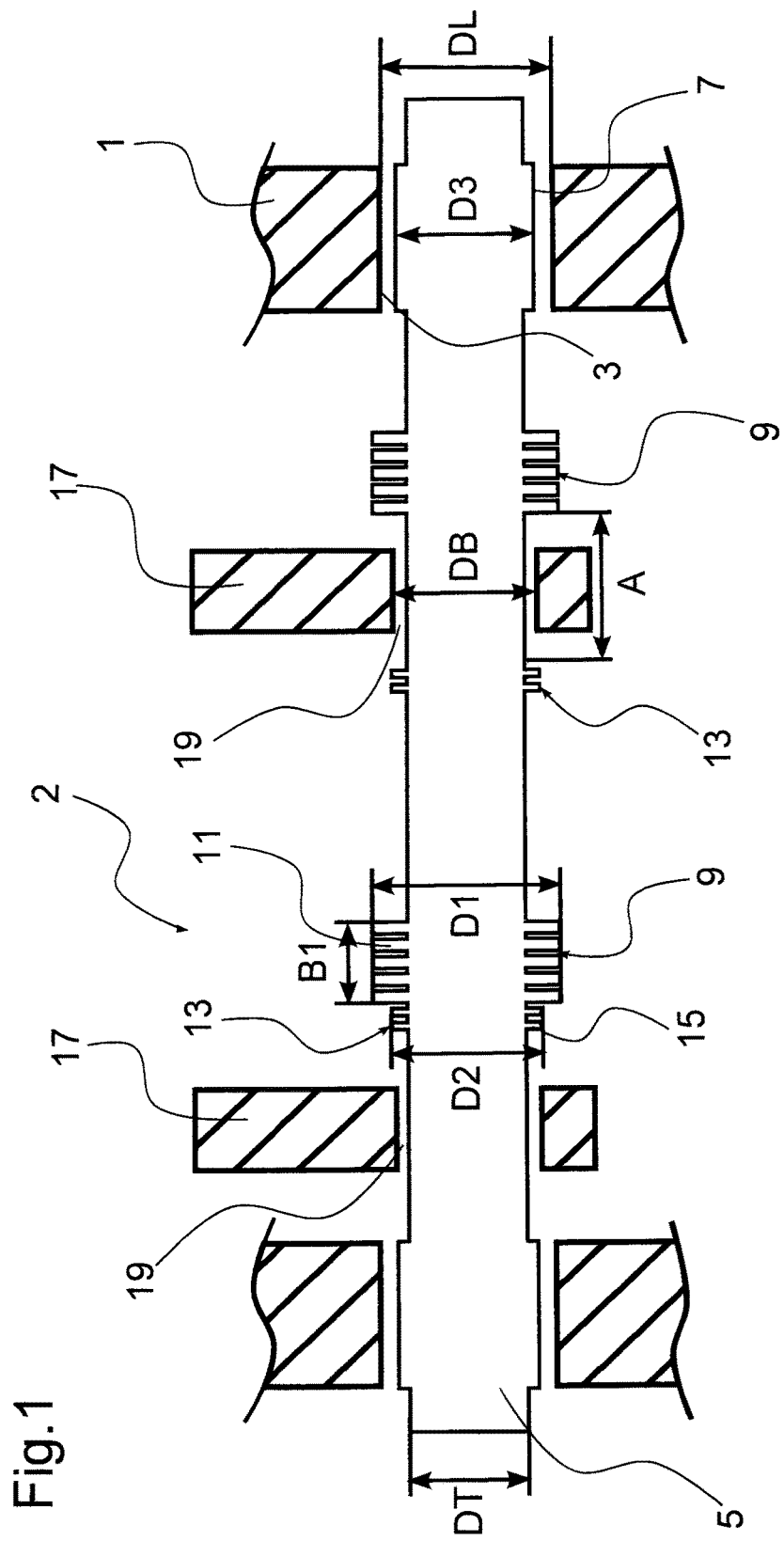

In FIG. 1, a cylinder head cover 1 with bearing receptacles 3 is shown. The representation has been kept purely schematic, and in order to facilitate understanding no further parts or details of the cylinder head cover 1 are shown. A support shaft 5 is held in the bearing receptacles 3. The support shaft 5 has bearing portions 7, which together with the bearing receptacles 3 forms sliding bearings for the support shaft 5. The bearing portions of the support shaft have an outside diameter D3. The support shaft has a diameter DT. The diameter D3 of the bearing portions may be greater than the diameter of the support shaft (as shown in FIG. 1). Alternatively, the two diameters may also be of equal size or the diameter D3 of the bearing portions may also be less than the diameter DT of the support shaft. This is the case for example whenever the bearing location has for example been worked by grinding.

The support shaft 5 also has in the first regions 9 first diametrical enlargements 11. The first diametrical enlargements 11 have an outside diameter D1. Furthermore, the support shaft has second regions 13 with second diametrical enlargements 15, which have an outside diameter D2. The first diametrical enlargements 11 and the second diametrical enlargements 15 are rotationally symmetrical about the axis of rotation of the support shaft 5. The diameter D2 in the second regions 13 is less than the diameter D1 in the first regions 9. In the left-hand part of FIG. 1, the first regions 9 directly adjoin the second regions 13. By contrast with this, in the right-hand part of FIG. 1 an axial distance A is provided between the first regions 9 and the second regions 13.

Two components 17 are arranged on the support shaft. The components 17 respectively have a through-opening 19, through which the support shaft 5 is led. The inside diameter of the components is identified by DB. The component 17 shown on the right is arranged between a first region 9 and a second region 13. The inside diameter DB of the components is less than the diameter D1 in the first regions 9 and the diameter D2 in the second regions. In this way, an overlap between the component 17 and the first regions 9 or second regions 13 can be established, in order to fix the component 17.

The diametrical enlargements 11 and 15 shown on the left in FIG. 1 have been produced by rolling. The width B1 of the first regions 9 has been made to match the width of the component 17 to be secured on the first diametrical enlargement 11. By contrast, the diametrical enlargements 11 and 15 shown on the right in FIG. 1 have been produced by a grinding process, i.e. the support shaft 5 has been ground down from a greater diameter (likewise for example a rolling operation) to the diameters D1 and D2, respectively. In the exemplary embodiments of the invention presented hereafter, however, only diametrical enlargements produced by rolling operations are shown.

During the assembly of the support shaft, the cylinder head cover and the components to form the module shown in FIG. 1, the components 17 to be secured on the support shaft 5 are positioned in a predetermined sequence in such a way that their through-openings 19 are arranged in line with the bearing receptacles 3 of the cylinder head cover 1.

The angular alignment of the components 17 takes place later, so that in this method step no attention has to be paid to the angular alignment of the components 17 in relation to the support shaft 5. However, it is of advantage for the further method if for example all of the cam tips point in the same direction. In a next step, the support shaft 5 is cooled and/or the components 17 are heated up, so that the support shaft 5 with the first diametrical enlargements 11, the second diametrical enlargements 15 and the bearing portions 7 can be pushed through the through-openings of the components 19 and the bearing receptacles 3. A suitable heating-up process is heating up by means of induction. The support shaft 5 may for example be cooled down with liquid nitrogen or some other coolant.

The diameters of the bearing receptacles DL, the through-openings DB and the first diametrical enlargements D1 have been dimensioned during production in such a way that the diameters D1' and D3' of the cooled-down support shaft 4 are slightly less than the diameter DL of the bearing receptacles 3 and the diameters DB' of the heated-up components 17. In this way, the support shaft 5 can be easily pushed through the bearing receptacles 3 and the through-openings 19. During the insertion of the support shaft 5, the components 17 are positioned in such a way that a bearing portion 7 of the support shaft 5 is arranged in each bearing receptacle 3 and each component 17 is assigned to a second region 13. This assignment may for example take the form that each component 17 is arranged alongside the assigned second region 13, as shown in FIG. 1, or else that each component 17 has an overlap with the assigned second region 13. This variant is shown in FIG. 4a. After the insertion of the support shaft 5, a temperature equalization is carried out, in which the support shaft 5 is heated up and/or the components 17 are cooled down, so that an overlap is established, that is to say that the diameter of the through-openings DB of the components 17 is less than the diameter D2 of the assigned second diametrical enlargements 15.

FIG. 2 shows a component 17 at ambient temperature that is to be secured on the support shaft 5 in the course of the assembly of the camshaft or the module. Two orthogonal sections of the component are shown. The component 17 shown by way of example is a cam, which has a through-opening 19 with a diameter DB. The cam has a width B3 in the axial direction. However, not only cams but also other components, such as for example sensor wheels and the like, can be secured positionally correctly on the support shaft 5 by the method according to the invention. In the course of the present description of a specific exemplary embodiment of the invention, only the example of cams as components to be secured on the support shaft is considered for the sake of simplicity.

In FIG. 3, an enlargement of a detail of a portion of the support shaft 5 with a first diametrical enlargement 11 and a second diametrical enlargement 15 is shown. Both diametrical enlargements 11 and 15 are rotationally symmetrical about the axis of rotation of the support shaft. The first region 9, which has the first diametrical enlargement 11, has a width B1. The second region 13, which has the second diametrical enlargement 15, has a width B2.

Figure 4B:
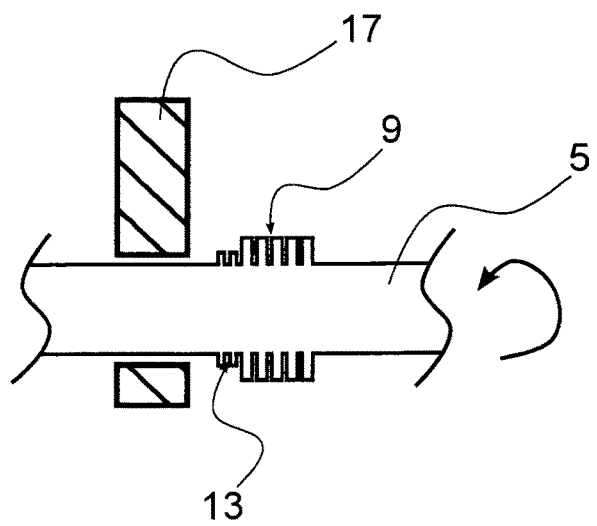

FIGS. 4a-4d schematically show various further method steps in the case of a variant of the angular setting between the component 17 and the support shaft 5. In FIG. 4a, the component 17 has an overlap with the assigned second region 13, so that it is releasably fixed in the assigned second region. This initial state can be achieved in various ways. In one variant, the components 17 are positioned in relation to the support shaft 5 before the described temperature equalization in such a way that during the temperature equalization between the shaft 5 and the components 17 there is at the same time a predetermined overlap of the component 17 with the second region 13 assigned to it. Or to put it another way, the component 17 is shrink-fitted onto the second region 13. In an alternative embodiment, the components 17 are positioned in such a way that, after the temperature equalization, they are arranged alongside the assigned second region 13. The releasable fixing by means of overlapping is then brought about by moving the support shaft 5 or the component 17. In this state, the component 17 is pre-positioned on the support shaft 5. Starting from this initial state, FIGS. 4a-4d show subsequent method steps. In the step that is shown in FIG. 4a, the component 17 is first released from the assigned second region 13. Since the diameter in the second region 19 is smaller than the diameter in the first region 9, the component 17 can be released from the second region 13 without great force being exerted. Moreover, only a small deformation of the component 17 takes place within the through-opening 19, and also only in the region of the original overlap. The form of the component 17 is accordingly only impaired slightly. Any deformation of the component 17 or the support shaft 5 in the later securing regions should be avoided in earlier method steps, since this can have adverse effects on the strength of the connection between the component 17 and the support shaft 5.

The release of the component 17 is indicated in FIG. 4a by the arrow. Next, the angular position of the component 17 in relation to the support shaft 5 is set. This takes place either by turning of the support shaft 5 (indicated by the arrow in FIG. 4b) or by turning of the component 17. Once the desired angular position is reached, the component 17 is pressed onto the first region 9 assigned to it or the assigned first region 9 is pressed into the through-opening 19 of the component 17. Indicated by the arrow in FIG. 4c. The result of the described method steps is shown in FIG. 4d. The camshaft portion shown comprises a support shaft 5 and a component 17 with a through-opening 19 for receiving the support shaft 5, the support shaft 5 having a first region 9, in which the component 17 is secured. Moreover, the camshaft portion has a first diametrical enlargement 11 and a second diametrical enlargement 15. The second diametrical enlargement 15 is arranged rotationally symmetrically in relation to the axis of rotation of the support shaft 5 and at the location of a second region 13. The diameter in the second region 13 is smaller here than the diameter in the first region 9.

During the pressing on or pressing in (shown in FIG. 4c), the component is moved over the second region 13. This can be avoided if an axial distance A is provided between the first assigned region 9 and the second assigned region 13. This variant is shown in the right-hand part of FIG. 1. In the case of this variant, the component 17 may first be releasably fixed with one side on the second region 13 and later secured with the opposite side on the assigned first region 9, by pressing on or pressing in. This has the advantage that a deformation of the through-opening 19 during the moving over the second region 13 can be avoided. Such a pre-deformation may influence the later strength of the connection of the component 17. In the case of this variant, only the final deformation occurs during the securement on the assigned first region 9 by pressing on or pressing in. The alternative embodiment, which is shown in FIGS. 4a-4d, has second regions 13, which directly adjoin the first regions 9. This makes a very compact type of construction possible.

Quite generally, the advantage of the pre-positioning and releasable fixing before the final securement is that the production of the camshaft or engine module can be automated more easily. If, for example, the components 17 are formed by cams, all of the cams 17 can be releasably fixed on the support shaft 5 in such a way that their cam lobes point in the same direction. The advantage of this procedure is that the press connection between the cams 17 and the support shaft 5 that is to be carried out after the positioning of the cams can take place in an easy way in an automated method step. In the course of an automated production of the press connection between the component/cam 17 and the support shaft 5 with the aid of a pressing-on device or a pressing-in device, it is advantageous if the relative position of the components/cams 17 is predefined. The device then does not require any means to determine for each component/cam 17 its actual relative position in the circumferential direction before the required angular position of the component/cam 17 on the support shaft 5 is set by turning the support shaft in relation to the component/cam 17.

To put it another way: if the relative angular position of the components/cams 17 in relation to the support shaft 5 after their positioning and before the establishment of the press connection is not already known as a result of temporary fixing of the components/cams 17 on the support shaft 5, the relative angular position of the components/cams 17 must first be determined before establishing the press connection, before it can be determined by which angle the support shaft 5 must be turned in order to ensure a desired angular position of the component/cam 17 on the support shaft 5. This makes it more difficult to automate the pressing of the components/cams 17 onto the support shaft 5 or the pressing of the support shaft 5 into the components/cams 17. If, on the other hand, after the positioning the components/cams 17 are always releasably fixed on the support shaft 5 in the same angular position, for example in an orientation in which all of the cam tips are pointing in the same direction, it is possible to dispense with the working step of determining the relative angular position of the components/cams 17 in relation to the support shaft 5, since the relative angular position is already known. The device for establishing the press connection between the components/cams 17 and the support shaft 5 can therefore be of a much simpler design and the method according to the invention for assembling the camshaft can proceed more quickly. The cycle time is increased significantly and more cost-effective operation of the production plant is achieved.

Figure 5A:
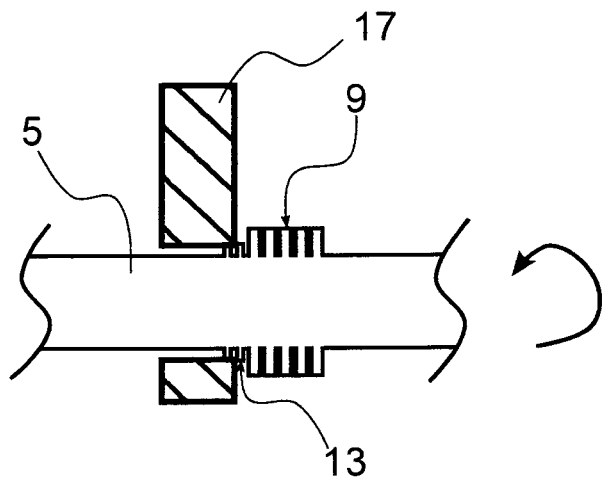
FIGS. 5a-5c show various method steps between the pre-positioning and the securement of a component in the case of a second embodiment of the invention.
Figure 5B:
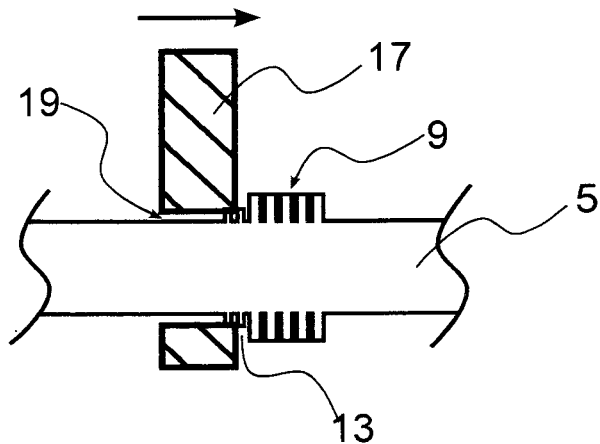
Figure 5C:
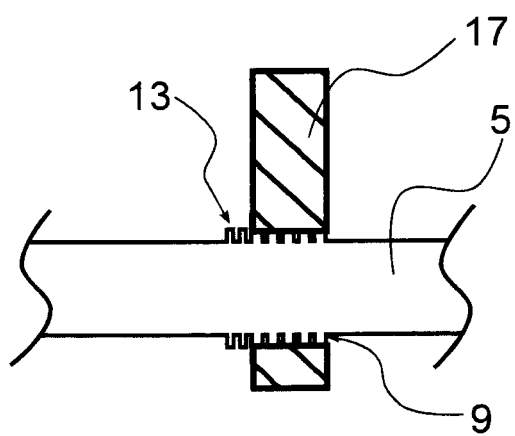

FIGS. 5a-5c schematically show various method steps in the case of an alternative variant of the angular setting between the component 17 and the support shaft 5. In the case of this variant, the angular position of the component 17 is set while the component 17 is releasably fixed in the assigned second region 13. In FIG. 5a, this is indicated by the arrow. This has the advantage that the additional step of release from the fixing (shown in FIG. 4a) is eliminated, and the method can consequently be carried out more efficiently.

Figure 4C:
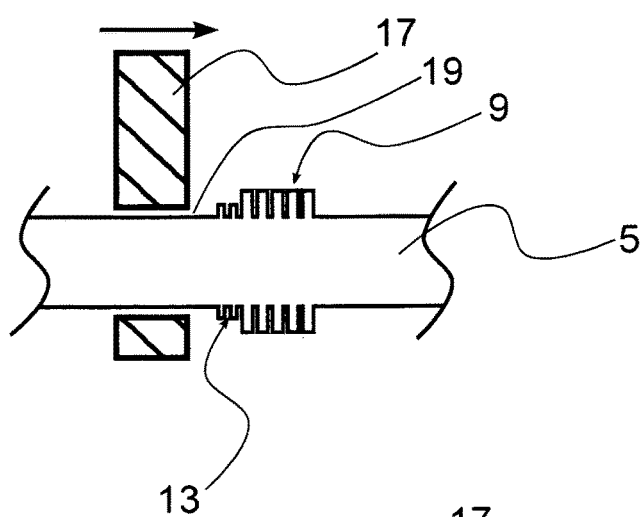
Figure 4D:
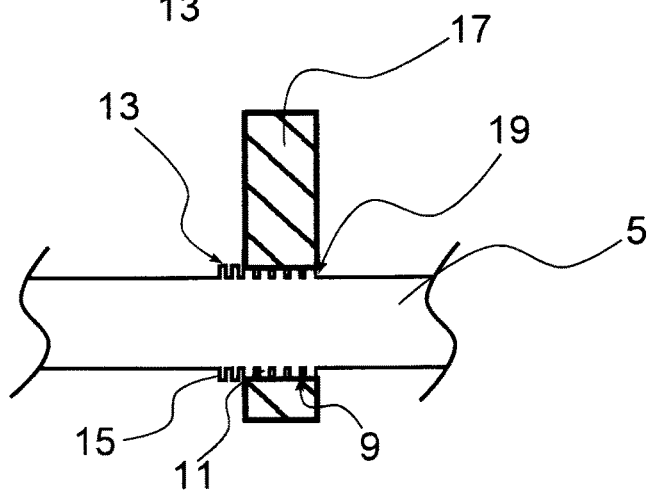

The further steps, which are shown in FIGS. 5b and 5c, take place in a way analogous to the variant already described (cf. FIGS. 4c and 4d).

Figure 6A:
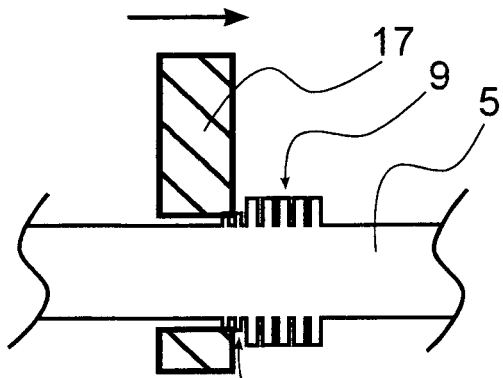
FIGS. 6a-6b show various method steps between the pre-positioning and the securement of a component in the case of a third embodiment of the invention.
Figure 6B:
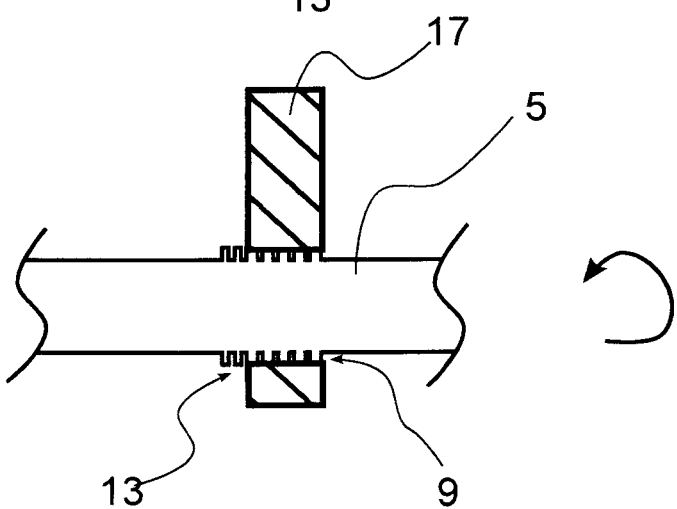

A third embodiment of the angular setting between the component 17 and the support shaft 5 is shown in FIGS. 6a and 6b. In the case of this variant, the component 17 is first secured in the first region 9 (indicated by the arrow in FIG. 6a). Only after that does the setting of the angular position take place (indicated in FIG. 6b by the arrow).

Figure 6C:
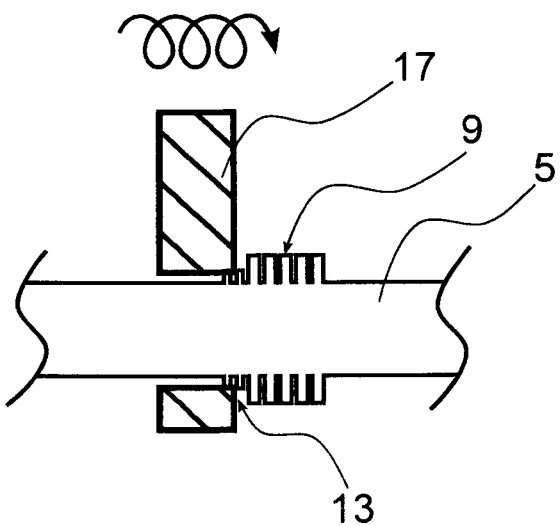
FIG. 6c shows a further embodiment in which the angular setting and the securement take place by means of a helical movement.

In the case of a further design, which is shown in FIG. 6c, these two method steps are also combined, in that the component 17 and the shaft 5 are turned with respect to one another in a helical manner during the securement by pressing on or pressing in. This is indicated in FIG. 6c by the arrow.

Figure 7:
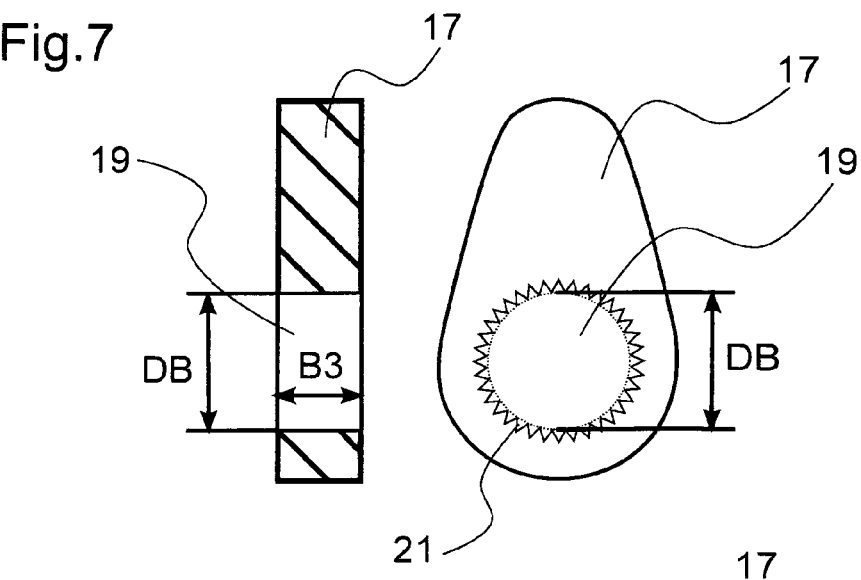
FIG. 7 shows a component in the form of a cam with a serration in the through-opening.

In FIG. 7, a further embodiment is shown, one in which the component 17 has a serration 21 in the through-opening 19. The inside diameter DB is in this case formed by the tips of the serration 21.

Figure 8:
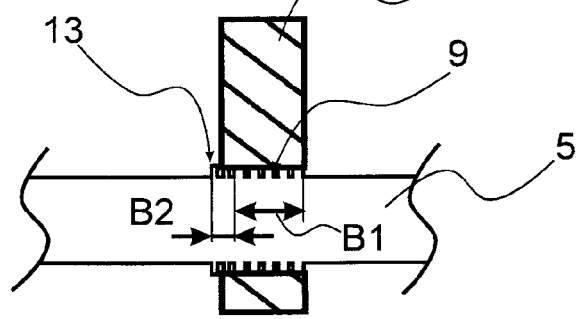
FIG. 8 shows a secured component, in the case of which the second regions lie at least partially within the through-opening.

A special design of the invention is shown in FIG. 8. In the case of this variant, the second regions 13 lie at least partially within the through-opening 21. In the case of the embodiment shown, the through-opening 21 overlaps the first region 9 completely and the second region 14 partially. Moreover, the second region 13 directly adjoins the first region 9. The relationships B3>B1 and B1+B2>B3 apply. In the case of a further variant (not shown), the first and second regions adjoin one another and lie completely within the through-opening. Then the relationship B3>B1+B2 applies.

Figure 9:
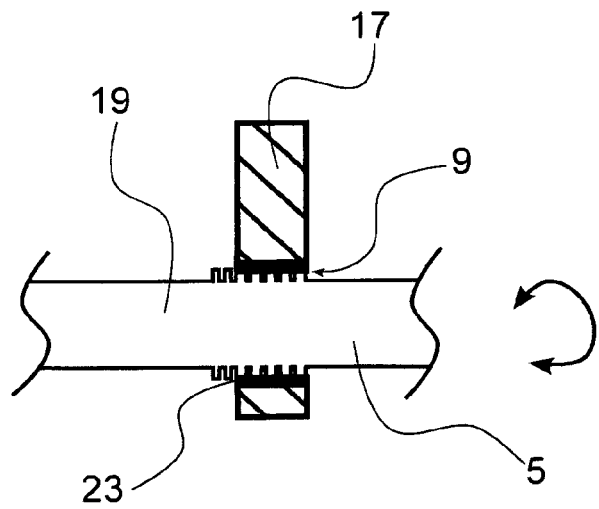
FIG. 9 shows a schematic representation of a camshaft portion with a coating between the support shaft and the component.

FIG. 9 shows an additional development of the invention. A coating 23 is arranged between the component and the support shaft 5, in order to increase the strength of the connection between the support shaft 5 and the component 17. As a result, a higher torque can be transferred between the component 17 and the support shaft 5. This coating 23 may alternatively be applied before the assembly of the component 17 and the support shaft 5 on the first region 9, or on the inner side of the through-opening 19 of the component 17 or both on the first region 9 and on the component 19. It goes without saying that the coating 23 does not have to be confined to the later area of contact between the support shaft 5 and the component 17. A coating of the entire support shaft 5 or of the entire component is likewise possible. The coating 23 comprises for example zinc or phosphate, since it has been found that these materials improve the strength of the connection particularly well. A further increase in the strength of the connection is achieved if the component 17 is turned at high frequency about the required angular position. Here, after pressing on or pressing in, the component 17 is turned back and forth by a maximum of +/−20° in relation to the support shaft 5 before the required angular position is set. This turning is indicated in FIG. 9 by the double-headed arrow. The turning causes a diffusion of the coating into the regions of the component 17 and the support shaft 5 that are near the surface, which further increases the strength of the connection.

FIGS. 10 and 11 show an embodiment in which the method according to the invention is used in the course of the assembly of an adjustable camshaft. In the case of this embodiment, the support shaft 5 is formed as a hollow shaft. In the interior of the support shaft 5, an inner shaft 25 is arranged concentrically in relation to the support shaft 5, the inner shaft 25 being able to turn in relation to the support shaft 5. Components 17 are provided, connected to the support shaft 5 by a press connection in the way described above. In addition to the components 17, at least one further component 27, which is not connected to the support shaft 5 but is connected to the inner shaft 25 for rotation therewith, is provided. The connection of the component 27 to the inner shaft 25 for rotation therewith takes place for example by way of a pin connection, as explained in more detail further below. In this way, the components 27 can be turned together with the inner shaft 25 in relation to the support shaft 5 and the components 17 that are fixedly connected to the support shaft 5.

The components 17 and 27 are preferably formed by cams, by way of which the gas-exchange valves of an internal combustion engine are actuated. A relative turning of the inner shaft 25 in relation to the support shaft 5 achieves the effect that the opening and closing times of the valves actuated by the cams 27 are changed. In this way, an adjustable camshaft that has been produced by using the method according to the invention is provided.

The support shaft 5 shown in FIG. 10 is formed as a hollow shaft. In the interior of the support shaft 5, an inner shaft 25 is arranged concentrically thereto (cf. FIG. 11). The inner shaft 20 can turn in relation to the support shaft 5. The support shaft 5 shown in FIG. 10 has a first region 9 with a first diametrical enlargement 11. Directly adjoining the first region 9 there is a second region 13 with a second diametrical enlargement 15. These two diametrical enlargements 11 and 15 are assigned to the component 17 and serve the purpose of forming a press connection with the component 17 in the way described above. Arranged alongside the component 27 is a second region 13 with a second diametrical enlargement 15. This second diametrical enlargement 15 is assigned to the component 27. The second diametrical enlargement 15 serves for the releasable fixing of the component 27 on the support shaft 5, as described in more detail further below. Furthermore, the support shaft 5 has an opening 29. The component 27, which in the exemplary embodiment shown is formed as a cam, has a bore 31. The inner shaft 25, to be arranged in the hollow support shaft 5 (cf. FIG. 11), is not shown in FIG. 10. The opening 29 and the bore 31 serve for securing the component 27 to the inner shaft 25 for rotation therewith. This is explained further below on the basis of FIG. 11.

In the state of the adjustable camshaft that is shown in FIG. 10, a number of method steps have already taken place. The support shaft 5 has already been cooled and/or the components 17, 27 have been heated up, so that the support shaft 5 was able to be pushed with its first diametrical enlargements 11 and its second diametrical enlargements 15 through the through-openings 19 of the components 17, 27. After the pushing through, the temperature equalization already took place, in that the support shaft 5 was heated up and/or the components 17, 27 were cooled down.

While the component 17 is treated in the same way as already described before with reference to FIGS. 1-9, different method steps take place for the component 27. Firstly, a predetermined overlap of the component 27 with the assigned second region 13 is established, so that the component 27 is held in a releasably fixed manner in the assigned region 13. This may happen either by displacing the component 27 in relation to the support shaft 5 or by suitable positioning before the temperature equalization, so that shrink-fitting onto the assigned diametrical enlargement 15 takes place. This is explained in detail with reference to FIG. 4a.

The component 27 can without any problem be pushed down again from the diametrical enlargement, in order to set the desired relative angular position between the support shaft 5, the inner shaft 25 (not shown) and the component 27. The components 17 and 27 can in this way be held in a releasably fixed manner on the support shaft 5 in a desired, already known relative angular position. As a result, the automation of the pressing of the components 17 onto the support shaft 5 that subsequently takes place or the pin connection between the component 27 and the inner shaft 25 (not shown) that subsequently takes place (cf. FIG. 11) is facilitated and the cycle time in the assembly of the camshafts is increased.

Once the component 27 has been pushed down from the diametrical enlargement 15, the support shaft 5 can be turned freely in relation to the component 27. Subsequently, the support shaft 5 and the inner shaft 25 (not shown) are turned in such a way that the opening 29, the first bore 33 in the inner shaft 25 (not shown) and the second bore 31 in the component 27 are in line with one another. After that, a connecting pin 35 is pressed through the opening 21 into the first bore 33 and the second bore 31, whereby the component 27 is connected to the inner shaft 25 for rotation therewith. The component 27 can then be turned in relation to the support shaft 5 by turning of the inner shaft 25.

The assembled state of the adjustable camshaft is shown in FIG. 11. At the ends of the support shaft 5, the inner shaft 25 protrudes out of the support shaft 5. The component 17 is connected to the support shaft 5 by means of a non-positive or non-positive and positive press connection. In the region of the component 27, the shaft arrangement is shown in axial half-section. The hollow support shaft 5 surrounds the inner shaft 25. A connecting pin 35 has been pressed through the opening 29 (not visible in FIG. 11) in the support shaft 5 into the first bore 33 of the inner shaft 25 and the second bore 31 of the component 27. Between the support shaft 5 and the inner shaft 25 there is an annular gap. By way of the connecting pin 35, the component 27 is connected to the inner shaft 25 for rotation therewith. The component 27 can be turned in relation to the support shaft 5, in that the inner shaft 25 is turned in relation to the support shaft 5. In FIG. 11, the diametrical enlargement 15 on which the component 27 was previously held in a releasably fixed manner can be seen to the left of the component 27.

Figure 12A:
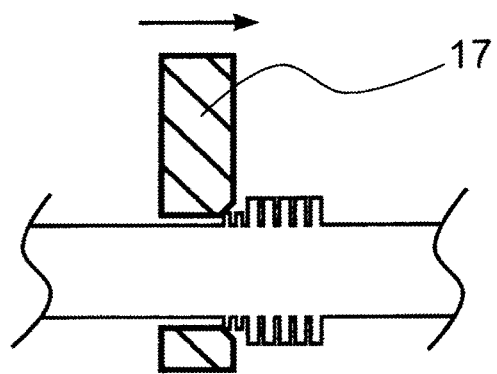
FIG. 12a and FIG. 12b show a component with a funnel-like mouth opening.
Figure 12B:
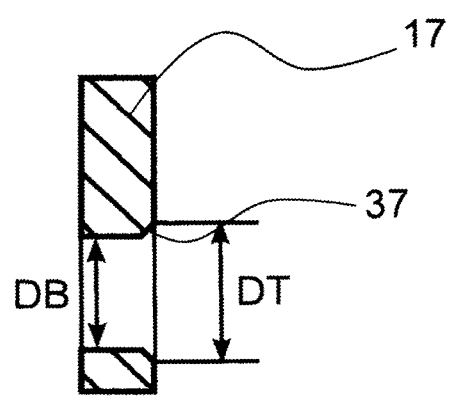

FIGS. 12a and 12b show an additional development of the invention. In the case of this embodiment, the component 17 has a funnel-shaped widening 37. The outside diameter of the funnel-shaped widening 37 is denoted by DT. The diameter DT of the widening is preferably greater than the diameter D1 of the first regions and the diameter D2 of the second regions. During the fixing of the component 17 on the first and second regions, the deformation of the regions then does not take place through the peripheral region of the component, but at the flank of the funnel-shaped widening 37. In this way, the loading of the component is displaced toward the middle of the component. As a result, excessive loads at the peripheral region of the component are avoided.

The invention claimed is:

1. A method for assembling a camshaft from a support shaft and components to be connected to the support shaft, the components having through-openings for receiving the support shaft, the method comprising:
   providing a support shaft having first diametrical enlargements having first diameters in first regions, in which the components are to be secured, and second diametrical enlargements having second diameters in second regions, in which the components are to be pre-positioned, the second diameters in the second regions being smaller than the first diameters in the first regions;

at least one of cooling the support shaft and heating the components so that the support shaft can be pushed with its first and second diametrical enlargements through the through-openings of the components;

advancing the support shaft through the through-openings, so that each component is assigned to a second region of the second regions;

at least one of heating the support shaft and cooling the components, so that a respective diameter (DB) of the through-openings of the components is less than the second diameters of the second diametrical enlargements;

establishing a predetermined overlap of the components with the second regions assigned to the components so that the components are held in a releasably fixed manner in the assigned second regions; and at least one of pressing the components onto the first diametrical enlargements assigned to them and pressing the first diametrical enlargements into the assigned through-openings of the components, wherein a required angular position of each component in relation to the support shaft is respectively set before, during or after the pressing on or pressing in.

2. A method for assembling a module for a motor vehicle engine that comprises at least one cylinder head cover with bearing receptacles and a camshaft mounted in the bearing receptacles, the camshaft being constructed during assembly of the module from a support shaft and components to be connected to the support shaft, and the components having through-openings for receiving the support shaft, the method comprising:

providing a support shaft having first diametrical enlargements in first regions, in which the components are to be secured, and second diametrical enlargements in second regions, in which the components are to be pre-positioned, the diameter (D2) in the second regions being smaller than the diameter (D1) in the first regions, and having bearing portions in the regions in which the completed camshaft is to be mounted in the bearing receptacles;

positioning the components to be secured on the support shaft in a predetermined sequence in such a way that their through-openings are arranged in line with the bearing receptacles of the cylinder head cover;

at least one of cooling the support shaft and heating the components so that the support shaft can be pushed with its first and second diametrical enlargements and bearing portions through the through-openings of the components;

advancing the support shaft through the bearing receptacles and the through-openings, so that a bearing portion of the support shaft is arranged in each bearing receptacle and each component is assigned to a second region of the second regions;

at least one of heating the support shaft and cooling the components so that a diameter (DB) of the through-openings of the components is less than the diameter (D2) of the second diametrical enlargements;

establishing a predetermined overlap of the components with the second regions assigned to the components so that the components are held in a releasably fixed manner in the assigned second regions; and at least one of pressing the components onto the first diametrical enlargements assigned to them and pressing the first diametrical enlargements into the assigned through-openings of the components, wherein a required angular position of each component in relation to the support shaft being respectively set before, during or after the pressing on or pressing in.

3. The method of claim 1 wherein establishing the overlap occurs concurrent to the at least one of heating the support shaft and cooling the components.

4. The method of claim 1 wherein the respectively required angular position of each component in relation to the support shaft is set before the pressing by simple turning of the support shaft by a certain angle.

5. The method of claim 1 wherein each component is first released from the assigned second regions, the required angular position of the component in relation to the support shaft is set and finally the component is secured by the pressing.

6. The method of claim 1 wherein the required angular position of the components in relation to the support shaft is set while the components are releasably fixed in the assigned second regions, and finally the component is secured by the pressing.

7. The method of claim 1 wherein the required angular position of the components in relation to the support shaft is set while the components are secured in the first regions.

8. The method of claim 1 wherein the support shaft is formed as a hollow shaft, having an interior of which an inner shaft is arranged concentrically in relation to the hollow shaft, the inner shaft being able to be turned in relation to the hollow shaft, and in that, after a temperature equalization, at least one component which is not connected to the support shaft but is connected to the inner shaft for rotation therewith is provided.

9. The method of claim 8 wherein the component is connected to the inner shaft by means of a pin connection, an opening being provided in the support shaft formed as a hollow shaft, a first bore being provided in the inner shaft and a second bore being provided in the component, in that the opening, the first bore and the second bore are positioned in line with one another, and in that a connecting pin is pressed through the opening into the first bore and into the second bore.

10. The method of claim 9 wherein at least one of the support shaft has a coating in the first regions and the component has a coating within the through-opening, in order to increase strength of the connection between the support shaft and the component.

11. The method of claim 10 wherein the components are turned at high frequency about the required angular position.

12. A camshaft comprising:
a support shaft; and
a number of components with through-openings for receiving the support shaft, the support shaft having first regions, in which the components are secured and which have a first diametrical enlargement, wherein
the support shaft has second regions with a rotationally symmetrical second diametrical enlargement, wherein the respective second diametrical enlargements are smaller than the respective first diametrical enlargements, the support shaft configured to be pushed with the first and second diametrical enlargements through the through-openings of the components subsequent to at least one of cooling the support shaft and heating the components whereby each component is assigned to a second region of the second regions.

13. The camshaft of claim 12 wherein the second regions lie at least partially within the through-openings.

14. The camshaft of claim 13 wherein an axial distance is provided between the first regions and the second regions.

15. The camshaft of claim 12 wherein a coating is arranged between the components and the support shaft wherein the coating increases the strength of the connection between the support shaft and the components.

16. The camshaft of claim 12 wherein a respective diameter of the through-openings of the components is less than a corresponding diameter of the second diametrical enlargement subsequent to at least one of heating the support shaft and cooling the components.

17. The camshaft of claim 16 wherein the components overlap with the second regions such that the components are held in a releasably fixed manner.

18. A camshaft comprising:
a support shaft; and
a number of components with through-openings for receiving the support shaft after at least one of cooling the shaft and heating the components, the support shaft having first regions, in which the components are secured and which have a first diametrical enlargement and second regions, in which the components are pre-positioned before securing on the first regions and which have a rotationally symmetrical second diametrical enlargement, wherein the respective second diametrical enlargements are smaller than the respective first diametrical enlargements.

\* \* \* \* \*